(12) United States Patent
Li et al.

(10) Patent No.: US 11,465,488 B2
(45) Date of Patent: Oct. 11, 2022

(54) LUBRICATING OIL SUPPLY STRUCTURE

(71) Applicant: NTN CORPORATION, Osaka (JP)

(72) Inventors: Huaxia Li, Shizuoka (JP); Shinya Taikou, Shizuoka (JP); Shiro Tamura, Shizuoka (JP)

(73) Assignee: NTN CORPORATION, Osaka (JP)

( * ) Notice: Subject to any disclaimer, the term of this patent is extended or adjusted under 35 U.S.C. 154(b) by 934 days.

(21) Appl. No.: 16/316,386

(22) PCT Filed: Jun. 23, 2017

(86) PCT No.: PCT/JP2017/023210
§ 371 (c)(1),
(2) Date: Jan. 9, 2019

(87) PCT Pub. No.: WO2018/016267
PCT Pub. Date: Jan. 25, 2018

(65) Prior Publication Data
US 2019/0299769 A1  Oct. 3, 2019

(30) Foreign Application Priority Data

Jul. 22, 2016 (JP) .............................. JP2016-144663

(51) Int. Cl.
*B60K 7/00* (2006.01)
*B60K 17/04* (2006.01)
(Continued)

(52) U.S. Cl.
CPC .............. *B60K 7/0007* (2013.01); *B60K 7/00* (2013.01); *B60K 17/043* (2013.01); *F16H 57/02* (2013.01);
(Continued)

(58) Field of Classification Search
CPC ........ B60K 7/007; B60K 7/00; B60K 17/043; B60K 17/046; B60K 11/02
See application file for complete search history.

(56) References Cited

U.S. PATENT DOCUMENTS 5,127,485 A * 7/1992 Wakuta ................ B60K 7/0007
310/67 R
5,691,584 A * 11/1997 Toida ..................... H02K 7/116
310/67 R
(Continued)

FOREIGN PATENT DOCUMENTS

EP  2 487 060   8/2012
EP  3 028 888   6/2016
(Continued)

*Primary Examiner* — Hau V Phan
(74) *Attorney, Agent, or Firm* — Clark & Brody LP

(57) ABSTRACT

A lubricating oil supply structure in an in-wheel motor drive device (10) includes an oil tank (47) provided a lower part of a motor unit (21) and/or a reducer unit (31), configured to store lubricating oil, an oil pump (54) configured to pump up lubricating oil from the oil tank, and an oil pipe (70) fixedly attached in an upper part of the motor unit and/or the reducer unit. The oil pipe (70) includes an inlet (76) through which lubricating oil pumped up from the oil pump (54) flows therein, and at least one outlet (77) provided between one end thereof and the other end thereof, configured to discharge lubricating oil flown in from the inlet (76) downwards.

6 Claims, 5 Drawing Sheets

(51) Int. Cl.
*F16H 57/02* (2012.01)
*F16H 57/04* (2010.01)
*H02K 5/20* (2006.01)
*H02K 7/116* (2006.01)
*H02K 9/19* (2006.01)
*B60K 11/02* (2006.01)
*H02K 7/00* (2006.01)

(52) U.S. Cl.
CPC ........... *F16H 57/04* (2013.01); *F16H 57/045* (2013.01); *F16H 57/0424* (2013.01); *F16H 57/0436* (2013.01); *F16H 57/0476* (2013.01); *H02K 5/20* (2013.01); *H02K 7/116* (2013.01); *H02K 9/19* (2013.01); *B60K 11/02* (2013.01); *F16H 2057/02034* (2013.01); *H02K 7/003* (2013.01); *Y02T 10/64* (2013.01)

(56) References Cited

U.S. PATENT DOCUMENTS

| | | | | |
|---|---|---|---|---|
| 7,641,010 B2* | 1/2010 | Mizutani | ............ | B60K 17/046 180/65.6 |
| 7,703,780 B2* | 4/2010 | Mizutani | ............ | B60G 3/20 280/124.144 |
| 8,596,395 B2* | 12/2013 | Hirano | ............ | B60K 17/046 301/6.91 |
| 8,720,623 B1* | 5/2014 | Kim | ............ | B60L 3/0061 180/65.51 |
| 9,090,142 B2* | 7/2015 | Lee | ............ | B60K 17/043 |
| 2008/0035399 A1* | 2/2008 | Murata | ............ | B60K 17/046 184/6.28 |
| 2008/0083572 A1* | 4/2008 | Ishida | ............ | B60K 7/0007 180/55 |
| 2008/0308330 A1* | 12/2008 | Murata | ............ | B60G 7/005 180/65.51 |
| 2011/0011203 A1* | 1/2011 | Yamamoto | ............ | H02K 9/19 475/162 |
| 2011/0011656 A1* | 1/2011 | Poulsen | ............ | B60L 50/16 903/909 |
| 2012/0248850 A1* | 10/2012 | Hirano | ............ | F16D 65/12 301/6.5 |

FOREIGN PATENT DOCUMENTS

| | | |
|---|---|---|
| JP | 2006-248417 | 9/2006 |
| JP | 2008-044438 | 2/2008 |
| JP | 2008-141864 | 6/2008 |
| JP | 2010-261534 | 11/2010 |
| JP | 2012-138989 | 7/2012 |
| JP | 2014-135817 | 7/2014 |
| JP | 2015-107709 | 6/2015 |
| JP | 2016-005300 | 1/2016 |
| WO | 2012/046307 | 4/2012 |
| WO | 2013/011562 | 1/2013 |
| WO | 2013/146433 | 10/2013 |

* cited by examiner

Outer side in vehicle width direction
←

LUBRICATING OIL SUPPLY STRUCTURE

TECHNICAL FIELD

The present invention relates to a lubricating oil supply structure in an in-wheel motor drive device, and particularly relates to a lubricating oil supply structure including an oil pump.

BACKGROUND ART

There exists an in-wheel motor drive device, which includes a motor unit for driving a wheel, a wheel hub bearing unit, and a reducer unit having a plurality of gears to reduce rotation of the motor unit and transmit this to the wheel hub bearing unit. In such an in-wheel motor drive device, lubricating oil is used for cooling a heat generating element (stator) in the motor unit, and for lubricating and cooling a rotating element (gear and bearing) that configures a reducer mechanism in the reducer unit.

In a wheel drive device for vehicles shown in Japanese Unexamined Patent Publication No. 2006-248417 (Patent Document 1), the lowest gear in the reducer mechanism is immersed into (placed in an oil bath of) lubricating oil, and the lubricating oil is beaten up by rotation of the gear. This causes the lubricating oil to disperse inside the housing case that houses the reducer mechanism, thereby supplying the lubricating oil to substantially the entire gear reducer mechanism. Furthermore, with use of a gap between a hollow motor rotating shaft and the housing case, the dispersed lubricating oil is collected and is conveyed to an internal flow channel of a motor rotor, and is discharged to the stator.

An in-wheel motor structure shown in Japanese Unexamined Patent Publication No. 2008-044438 (Patent Document 2) is of a structure including a fluid drive source that pumps lubricating oil, namely an oil pump, and a discharge opening of the oil pump communicates with an oil flow channel that directs the lubricating oil to the reducer mechanism and an oil flow channel that directs the lubricating oil to the motor. The oil flow channel for a reducer is formed within the shaft; oil passing through the oil flow channel is supplied to a bearing through an opening at a tip part of the shaft and is supplied to the gear through an oil bore by centrifugal force at the time of shaft rotation.

The oil flow channel for a motor is implemented by a tubular resilient member disposed between a bottom surface of a knuckle and an end surface in an outer side of a vehicle of a stator core, namely by an oil delivery, and the lubricating oil is supplied to the motor via a plurality of distributing holes formed in the oil delivery and an oil groove extending in an axial direction formed on an inner peripheral surface of a peripheral wall of the knuckle (motor case).

CITATION LIST

Patent Literatures

[Patent Document 1] Japanese Unexamined Patent Publication No. 2006-248417 (Japanese Patent No. 4550631)
[Patent Document 2] Japanese Unexamined Patent Publication No. 2008-044438 (Japanese Patent No. 4501911)

SUMMARY OF INVENTION

Technical Problem

If an oil bath type lubricating oil supply structure as shown in Patent Document 1 is employed in an in-wheel motor drive device whose reducer unit is configured of a multistage reducer, the lubrication of the rotating element (gear and bearing) disposed at a position higher than the oil surface may become insufficient. In the contrary, if the amount beaten up is increased by raising the oil surface by for example increasing the amount of contained oil, to improve the lubricating performance of the rotating element, the power loss due to the stirring resistance increases, thereby leading to a decrease in efficiency of the entire in-wheel motor drive device.

Furthermore, with the oil bath type lubricating oil supply structure, since the lubricating oil cannot be applied in a manner aiming at a certain part required to lubricate or cool, even if the contained amount of oil is increased, the insufficiency in lubricity or cooling may not become resolved. Moreover, as in Patent Document 1, in a type in which lubricating oil is supplied to the stator via a shaft center of a hollow motor shaft, the position on the stator to which the lubricating oil is applied varies depending on the change in rotational speed of the motor, and thus the cooling performance of the stator does not stabilize.

The lubricating oil supply structure shown in Patent Document 2 employs an oil pump that pumps up lubricating oil in an oil tank and supplies the oil to each part; its structure has an oil flow channel for the reducer formed within the shaft, and lubricating oil is supplied by centrifugal force at the time of shaft rotation. Therefore, in a case of a multi-shaft parallel-shaft reducer unit, it is difficult to supply a suitable amount of lubricating oil while aiming at a part requiring lubrication or cooling even in the supply structure of Patent Document 2.

Moreover, in Patent Document 2, an oil flow channel for a motor is implemented by an oil delivery being a separate member from the casing; since the oil delivery is disposed facing an end surface on an outer side of the vehicle of the stator core, the supplying of lubricating oil to the outer peripheral surface of the stator core is implemented by a plurality of oil grooves formed on the casing and extending in an axial direction. However, since the lubricating oil first drops on the end on the outer side of the vehicle of the stator core before entering the oil groove, the lubricating oil may not reach the coil end on an end on an inner side of the vehicle at a low speed. Moreover, there is the need to provide the plurality of oil grooves that face the distribution bores of the oil delivery to the motor case itself, this causes the structure to become complex, and has low versatility.

The present invention is accomplished to solve the problems as like the above, and its object is to provide a lubricating oil supply structure having a simple structure and being capable of supplying lubricating oil accurately to parts requiring lubrication or cooling.

Solution to Problem

A lubricating oil supply structure according to an aspect of the present invention is a lubricating oil supply structure in an in-wheel motor drive device, the in-wheel motor drive device comprising a motor unit configured to drive a wheel, a wheel hub bearing unit, and a reducer unit having a plurality of gears, configured to reduce rotation of the motor unit and transmit that rotation to the wheel hub bearing unit. The lubricating oil supply structure comprises: an oil tank configured to store lubricating oil and disposed a lower part of the motor unit and/or the reducer unit; an oil pump configured to pump up lubricating oil from the oil tank; and an oil pipe fixedly mounted in an upper part of the motor unit and/or the reducer unit. The oil pipe includes an inlet through which lubricating oil pumped up from the oil pump flows therein, and at least one outlet provided between one end thereof and the other end thereof, configured to discharge the lubricating oil flown into the oil pipe from the inlet downwards.

According to this lubricating oil supply structure, since an outlet for the lubricating oil is formed between one end of the oil pipe to the other end of the oil pipe, which oil pipe is fixedly attached in an upper part of the motor unit and/or the reducer unit, it is possible to supply the lubricating oil accurately to the necessary parts by providing the outlet at a position facing the part requiring the lubrication or cooling. Moreover, since an oil channel is formed by an oil pipe separate from the motor unit and the reducer unit, there is no need to undergo any special processing to the casing that forms contours of the motor unit and the reducer unit. Therefore, the lubricating oil supply structure may be made as a simple structure.

The oil pipe preferably extends along an axle direction. In this case, it is preferable that the inlet is provided on one end of the oil pipe located on a side closer to the oil pump, and a plural number of the outlet is provided between the inlet and the other end of the oil pipe along the axle direction, spaced apart from each other.

In a configuration in which an internal space in the motor unit and an internal space in the reducer unit are partitioned by a partition, the oil pipe is preferably inserted through the partition and extends in the axle direction, and includes a first portion located in the internal space in the motor unit and a second portion located in the internal space in the reducer unit. Moreover, in this case, the outlet is preferably provided in each of the first portion and the second portion.

In a configuration in which the motor unit includes a stator core and a pair of coil ends disposed on either side of the stator core, in the first portion, the outlet is preferably provided at a position facing the coil ends.

Preferably, the oil pipe has a flange portion that is fixed to the partition with a bolt.

In a configuration in which the motor unit includes a motor casing that configures a contour of the motor unit and the reducer unit includes a reducer unit casing that configures a contour of the reducer unit and connects with the motor casing at the partition, the lubricating oil supply structure preferably further comprises a discharge oil channel. The discharge oil channel is formed within a wall thickness of the reducer unit casing and extends in a vertical direction, whose lower end communicates with a discharge opening of the oil pump and whose upper end communicates with the inlet of the oil pipe.

Preferably, the oil pipe includes a hollow cylindrical portion having a circular cross section, and in the hollow cylindrical portion, a plurality of the outlet is provided in parts varying in circumferential directional positions.

Advantageous Effects of Invention

According to the present invention, it is possible to accurately supply lubricating oil to parts requiring lubrication or cooling, with a simple structure.

DESCRIPTION OF EMBODIMENTS

An embodiment of the present invention is described in detail with reference to the drawings. Identical or equivalent portions within the drawings will be provided with identical reference symbols, and their descriptions will not be repeated.

(Basic Configuration Example)

Figure 1:
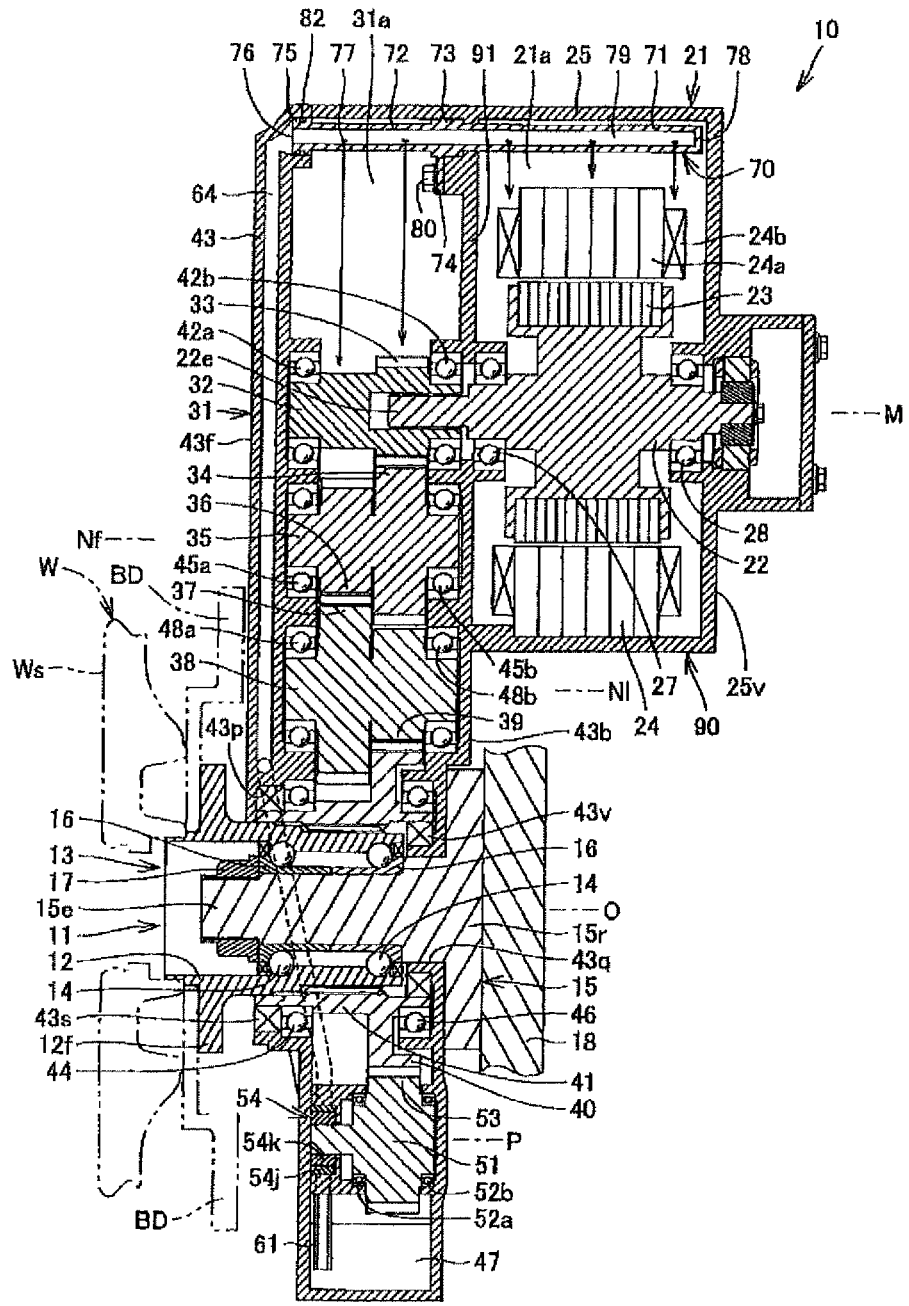
FIG. 1 is a longitudinal section view schematically showing a basic configuration of an in-wheel motor drive device and a lubricating oil supply structure according to an embodiment of the present invention.
Figure 2:
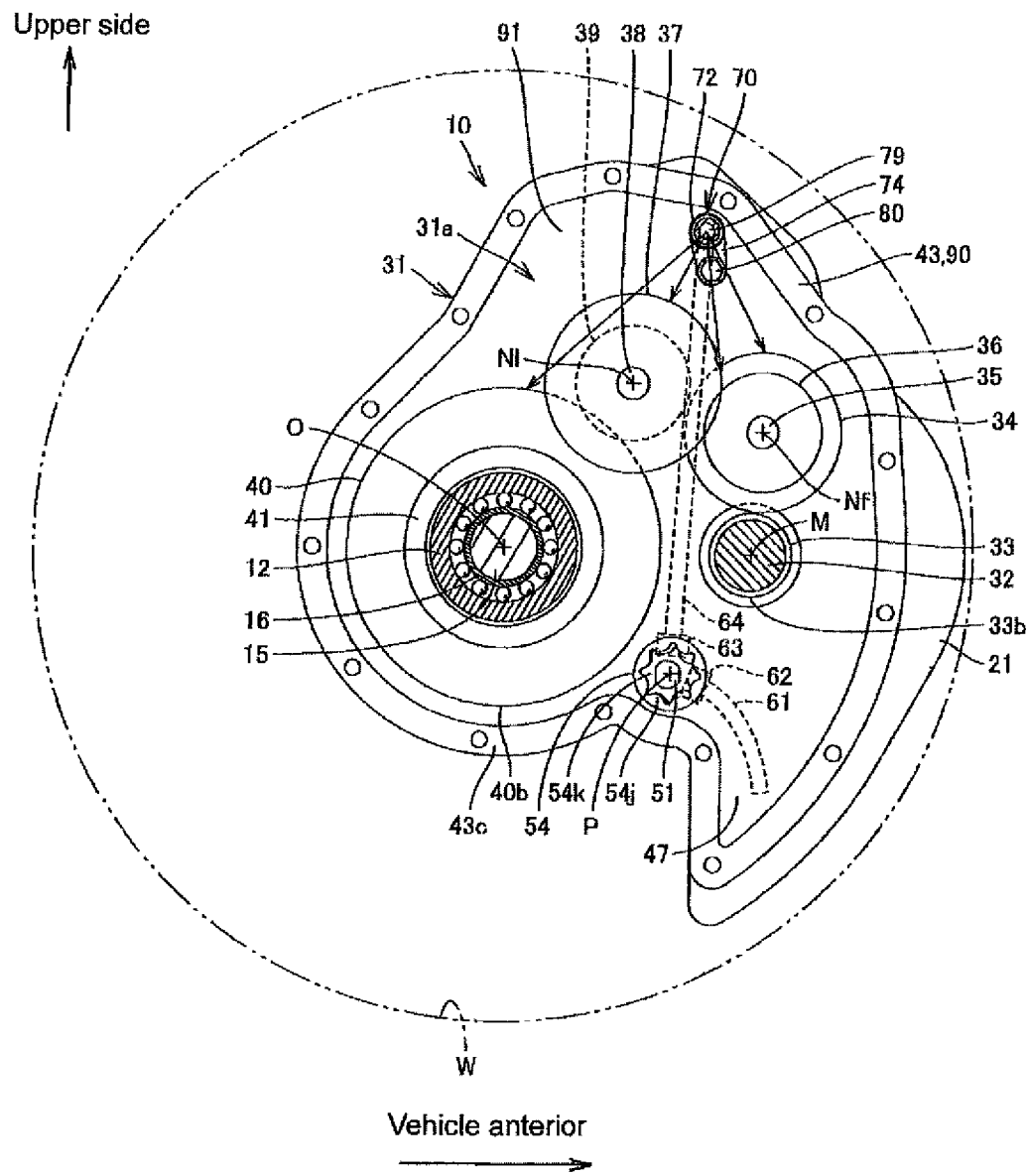
FIG. 2 is a cross sectional view schematically showing an inner structure of a reducer unit of an in-wheel motor drive device and a lubricating oil supply structure according to an embodiment of the present invention.

First described with reference to FIG. 1 and FIG. 2 is an example of a basic configuration of an in-wheel motor drive device 10 that employs a lubricating oil supply structure according to an embodiment of the present invention. The in-wheel motor drive device 10 is installed in passenger cars such as electric automobiles and hybrid vehicles.

FIG. 1 is a longitudinal section view cutting the in-wheel motor drive device 10 according to an embodiment of the present invention at a predefined plane, and showing this in a developed manner. FIG. 2 is a cross sectional view showing an inner structure of a reducer unit 31 of the in-wheel motor drive device 10, and schematically represents a state viewed from an outer side in a vehicle width direction. The predefined plane shown in FIG. 1 is a developed plan view connecting a plan view including an axis M and an axis Nf shown in FIG. 2, a plan view including the axis Nf and an axis Nl, a plan view including the axis Nl and an axis O, and a plan view including the axis O and an axis P, in this order. In FIG. 2, each gear within the reducer unit 31 is represented by an addendum circle, and each individual tooth is omitted in the drawing.

The in-wheel motor drive device 10 includes a wheel hub bearing unit 11 connecting with the center of a wheel W being represented by a virtual line as shown in FIG. 1, a motor unit 21 that drives the wheel W of the wheel, and the reducer unit 31 that reduces rotation of the motor unit 21 and transmits this to the wheel hub bearing unit 11, and is disposed in a wheel house (not shown) formed on an outer side in the vehicle width direction of a vehicle (passenger car). The motor unit 21 and the reducer unit 31 are not disposed coaxially with the axis O of the wheel hub bearing unit 11, but are disposed offset from the axis O of the wheel hub bearing unit 11.

The wheel W is one that is well known; a tire not shown is fitted onto the periphery of the wheel W, and are positioned at the front, rear, left and right of a vehicle body. The vehicle body constructs the passenger car together with the wheels. The in-wheel motor drive device 10 can make the passenger car run at a speed of 0 to 180 km/h on a public road.

The wheel hub bearing unit 11 has, as shown in FIG. 1, an outer ring 12 as a wheel hub that couples with the wheel W, an inner fixing member 13 passed through a center hole of the outer ring 12, and a plurality of rolling elements 14 disposed in a ring-shaped gap between the outer wheel 12 and the inner fixing member 13, to construct an axle. The inner fixing member 13 includes an unrotating stationary shaft 15, a pair of inner races 16, a lock nut 17, and a carrier 18. The stationary shaft 15 is formed to have a larger diameter at its root part 15r than its tip part 15e. The inner races 16 fit with the outer periphery of the stationary shaft 15, between the root part 15r and the tip part 15e. The lock nut 17 is screwed to the tip part 15e of the stationary shaft 15, and fixes the inner races 16 between the lock nut 17 and the root part 15r.

The stationary shaft 15 extends along the axis O, and penetrates through a reducer unit casing 43 that constitutes a contour of the reducer unit 31. The tip part 15e of the stationary shaft 15 penetrates through an opening 43p formed in a front part 43f of the reducer unit casing 43, and protrudes to the outer side in the vehicle width direction than the front part 43f. The root part 15r of the stationary shaft 15 penetrates through an opening 43q formed in a back part 43b from an inner side in the vehicle width direction than the back part 43b of the reducer unit casing 43. The front part 43f and the back part 43b are wall parts that are spaced apart in the axis O direction (axle direction) and face each other. The root part 15r has the carrier 18 fixedly attached thereto. The carrier 18 connects with a suspension device and a tie rod (not shown) outside the reducer unit casing 43.

The rolling element 14 is arranged in multiple rows separated in the axis O direction. An outer peripheral surface of the inner races 16 on one side in the axis O direction configures an inner race surface for a first row of the rolling element 14, and faces an inner peripheral surface of the one side in the axis O direction of the outer ring 12. The outer peripheral surface of the inner race 16 on the other side in the axis O direction configures an inner race surface for a second row of the rolling element 14, and faces an inner peripheral surface on the other side in the axis O direction of the outer ring 12. In the following description, the outwards side in the vehicle width direction (outboard side) is also referred to as one side in the axis direction, and an inwards side in the vehicle width direction (inboard side) is also referred to as the other side in the axis direction. The left-to-right direction in the drawing of FIG. 1 corresponds to the vehicle width direction. The inner peripheral surface of the outer ring 12 configures the outer race surface of the rolling element 14.

On one end of the outer ring 12 in the axis O direction, a flange portion 12f is formed. The flange portion 12f configures a coupling seat unit for coaxially coupling a brake disk BD and a spoke portion Ws of the wheel W. The outer ring 12 couples with the brake disk BD and the wheel W at the flange portion 12f, and rotates integrally with the wheel W.

As shown in FIG. 1, the motor unit 21 has a motor rotating shaft 22, a rotor 23, a stator 24, and a motor casing 25, and these are disposed successively in this order from the axis M of the motor unit 21 to an outer diameter side. The stator 24 includes a ring-shaped stator core 24a having the axis M serve as its center, and a pair of coil ends 24b disposed on either side of the stator core 24a in the axis M direction.

The motor casing 25 is of a hollow cylinder shape, and an end part of the motor casing 25 on an inner side in the vehicle width direction connects with a motor casing cover 25v. The motor casing 25 and the motor casing cover 25v configures a casing 90 of the in-wheel motor drive device 10, together with the reducer unit casing 43.

The axis M serving as the center of rotation for the motor rotating shaft 22 and the rotor 23 extends parallel to the axis O of the wheel hub bearing unit 11. Namely, the motor unit 21 is disposed offset, to be away from the axis O of the wheel hub bearing unit 11. An axial directional position of most parts of the motor unit 21 excluding the tip part of the motor rotating shaft 22 does not overlap with an axial directional position of the inner fixing member 13, as shown in FIG. 1.

The motor casing 25 is of a tubular shape, and couples with the back part 43b of the reducer unit casing 43 at one end in the axis M direction and is sealed to the motor casing cover 25v of a lid-shape at the other end in the axis M direction. As such, one portion (upper portion) of the back part 43b of the reducer unit 43 functions as a partition 91 that partitions an internal space (hereinafter called "motor chamber") 21a of the motor unit 21 and an internal space (hereinafter called "reducer chamber") 31a of the reducer unit 31. Both end parts of the motor rotating shaft 22 are rotatably supported to the motor casing 25 (partition 91) and the motor casing cover 25v via the rolling-element bearings 27, 28. The motor unit 21 drives the outer ring 12 and the wheels.

The reducer unit 31 has an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the reducer unit casing 43.

The input shaft 32 is a tubular body having a larger diameter than a tip part 22e of the motor rotating shaft 22, and extends along the axis M of the motor unit 21. The tip part 22e is received inside a center hole on the other end of the input shaft 32 in the axis M direction, and the input shaft 32 couples coaxially with the motor rotating shaft 22. Both ends of the input shaft 32 are supported by the reducer unit casing 43 (more specifically, the front part 43f and the partition 91) via the rolling-element bearings 42a, 42b. The input gear 33 is an external gear having a smaller diameter than the motor unit 21, and couples coaxially with the input shaft 32. More specifically, the input gear 33 is formed integrally with an outer periphery of a center part of the input shaft 32 in the axis M direction.

The output shaft 41 is a tubular body having a larger diameter than a tubular portion of the outer ring 12, and extends along the axis O of the wheel hub bearing unit 11. The other end of the outer ring 12 in the axis O direction is received in a center hole at the one end in the axis O direction of the output shaft 41, and the output shaft 41 couples coaxially with the outer ring 12. Rolling-element bearings 44, 46 are disposed on the outer periphery at either end of the output shaft 41 in the axis O direction. The one end of the output shaft 41 in the axis O direction is supported by the front part 43f of the reducer unit casing 43 via the rolling-element bearing 44. The other end of the output shaft 41 in the axis O direction is supported by the back part 43b of the reducer unit casing 43 via the rolling-element bearing 46. The output gear 40 is an external gear, and couples coaxially with the output shaft 41. More specifically, the output gear 40 is formed integrally with the outer periphery of the other end of the output shaft 41 in the axis O direction.

The two intermediate shafts 35, 38 extend parallel to the input shaft 32 and the output shaft 41. Namely, the reducer unit 31 is a quadruple-shaft parallel shaft gear reducer, and the axis O of the output shaft 41, the axis Nf of the intermediate shaft 35, the axis Nl of the intermediate shaft 38, and the axis M of the input shaft 32 each extend parallel to each other, in other words, extend in the vehicle width direction.

Describing in relation to the front-to-rear direction position of the vehicle of each shaft, as shown in FIG. 2, the axis M of the input shaft 32 is disposed in the vehicle anterior of the axis O of the output shaft 41. Moreover, the axis Nf of the intermediate axis 35 is disposed in the vehicle anterior of the axis M of the input shaft 32. The axis Nl of the intermediate shaft 38 is disposed in the vehicle anterior of the axis O of the output shaft 41 and in the vehicle posterior of the axis M of the input shaft 32. As a modification not shown, the axis M of the input shaft 32, the axis Nf of the intermediate shaft 35, the axis Nl of the intermediate shaft 38, and the axis O of the output shaft 41 may be disposed in the front-to-rear direction in this order. This order will also be the order in which the drive force will be transmitted.

Describing in relation to the vertical directional positions of each axis, the axis M of the input shaft 32 is arranged above the axis O of the output shaft 41. The axis Nf of the intermediate axis 35 is arranged above the axis M of the input shaft 32. The axis Nl of the intermediate shaft 38 is arranged above the axis Nf of the intermediate shaft 35. The plurality of intermediate shafts 35, 38 is sufficient as long as they are disposed above the input shaft 32 and the output shaft 41, and as a modification not shown, the intermediate shaft 35 may be disposed above the intermediate shaft 38. Alternatively, as a modification not shown, the output shaft 41 may be disposed above the input shaft 32.

The intermediate gear 34 and the intermediate gear 36 are external gears, and coaxially couple with a center part of the intermediate shaft 35 in the axis Nf direction as shown in FIG. 1. Both ends of the intermediate shaft 35 are supported by the reducer unit casing 43 via rolling-element bearings 45a, 45b. The intermediate gear 37 and the intermediate gear 39 are external gears, and coaxially couple with a center part of the intermediate shaft 38 in the axis Nl direction. Both ends of the intermediate shaft 38 are supported by the reducer unit casing 43 via rolling-element bearings 48a, 48b.

The reducer unit casing 43 constitutes the contour of the reducer unit 31 and the wheel hub bearing unit 11, is formed in a tubular shape, and surrounds the axes O, Nf, Nl, and M as shown in FIG. 2. Moreover, the reducer unit casing 43 is housed inside an internal space region of the wheel W. More specifically, the wheel hub bearing unit 11, the reducer unit 31, and one region of the motor unit 21 in the axial direction are housed within the internal space region of the wheel W, and the other region of the motor unit 21 in the axial direction protrudes out to the other side in the axial direction from the wheel W. As such, the wheel W houses most part of the in-wheel motor drive device 10.

Referring to FIG. 2, the reducer unit casing 43 has a portion protruding downwards at a directly below portion 43c of the axis O, and at a position away from the axis O of the output gear 40 in the front-to-rear direction of the vehicle, more specifically at directly below the axis M of the input gear 33. This protruding portion forms an oil tank 47, and is located below the directly below portion 43c.

Figure 6:
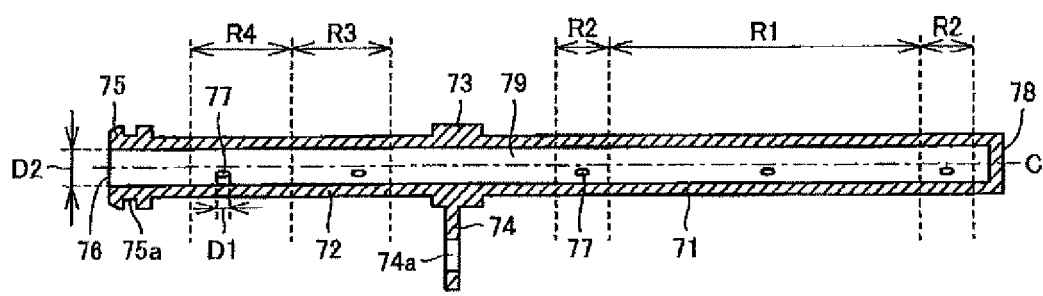
FIG. 6 is a longitudinal section view of the oil pipe taken along line VI-VI in FIG. 4.

The reducer unit casing 43, as shown in FIG. 6, houses the input shaft 32, the input gear 33, the intermediate gear 34, the intermediate gear 35, the intermediate gear 36, the intermediate gear 37, the intermediate shaft 38, the intermediate gear 39, the output gear 40, the output shaft 41, and a center part of the wheel hub bearing unit 11 in the axis O direction.

The reducer unit casing 43 has, as shown in FIG. 2, a tubular portion including the directly below portion 43c and the oil tank 47, as shown in FIG. 1, a substantially flat front part 43f that covers one side of the tubular portion of the reducer unit 31 in the axis direction, and a substantially flat back part 43b that covers the other side of the tubular portion of the reducer unit 31 in the axial direction. The back part 43b includes a portion coupling with the motor casing 25 and configuring the partition 91, and a portion coupling with the stationary shaft 15.

The front part 43f of the reducer unit casing 43 is formed with an opening 43p for the outer ring 12 to pass therethrough. The opening 43p is provided with a sealing material 43s that seals the ring-shaped gap with the outer shaft 41. Therefore, the outer ring 12 that serves as a rotatable body is housed in the reducer unit casing 43 except for the one end portion in the axis O direction. A sealing material 43v is disposed on an inner surface on the other end of the output shaft 41 in the axis O direction. The sealing material 43v seals a ring-shaped gap between the output shaft 41 and the back part 43b.

The input gear 33 with a small diameter and the intermediate gear 34 with a large diameter are disposed on the other side of the reducer unit 31 in the axial direction (the motor unit 21 side), and mesh with each other. The intermediate gear 36 with a small diameter and the intermediate gear 37 with a large diameter are disposed on the one side of the reducer unit 31 in the axial direction (the flange portion 12f side), and mesh with each other. The intermediate gear 39 with a small diameter and the output gear 40 with a large diameter are disposed on the other side of the reducer unit 31 in the axial direction, and mesh with each other. As such, the input gear 33, the plurality of intermediate gears 34, 36, 37, 39, and the output gear 40 mesh with each other, and constitute a drive transmission pathway from the input gear 33 through the plurality of intermediate gears 34, 36, 37, 39 and to the output gear 40. Due to the above meshing of the small diameter gears with the large diameter gears, the rotation of the input shaft 32 is reduced in speed at the intermediate shaft 35, the rotation of the intermediate shaft 35 is reduced in speed at the intermediate shaft 38, and the rotation of the intermediate shaft 38 is reduced in speed at the output shaft 41. Thus, the reducer unit 31 can sufficiently secure a reduction ratio.

As shown in FIG. 2, the output shaft 41, the intermediate shaft 38, and the input shaft 32 are disposed in this order, with intervals therebetween in the front-to-rear direction of the vehicle. Furthermore, the intermediate shaft 35 and the intermediate shaft 38 are disposed above the input shaft 32 and the output shaft 41. According to the embodiment, an intermediate shaft may be disposed above the outer ring 12 that serves as a wheel hub, to secure a space for disposing the oil tank 47 below the outer ring 12 or to secure a space for receiving a ball joint (not shown) directly below the outer ring 12. Therefore, a steering axis K extending in the vertical direction can be provided intersecting with the wheel hub bearing unit 11, and can suitably steer the wheel W and the in-wheel motor drive device 10 about the steering axis K.

Moreover, according to the present embodiment, as shown in FIG. 2, the plurality of intermediate shafts 35, 38 includes a first intermediate shaft 35 disposed above and adjacent to the input shaft 32, which first intermediate shaft 35 is supplied with drive torque from the input shaft 32, and a final intermediate shaft 38 disposed above and adjacent to the output shaft 41, which final intermediate shaft 38 supplies the drive torque to the output shaft 41, and the input shaft 32, the first intermediate shaft 35, the final intermediate shaft 38 and the output shaft 41, when viewed from the axial direction of the plurality of intermediate shafts 35, 38, are disposed in such a manner that a reference line successively connecting a center of the input shaft (axis M) and a center of the first intermediate shaft 35 (axis Nf) and a center of final intermediate shaft 38 (axis Nl) and a center of the output shaft 41 (axis O) draws an inverted U-shape. This reduces the size of the overall positioning of the plurality of shafts and gears that constitute the drive transmission pathway, and allows for housing the plurality of shafts and gears inside the wheel W.

(Lubricating Oil Supply Structure)

Figure 3:
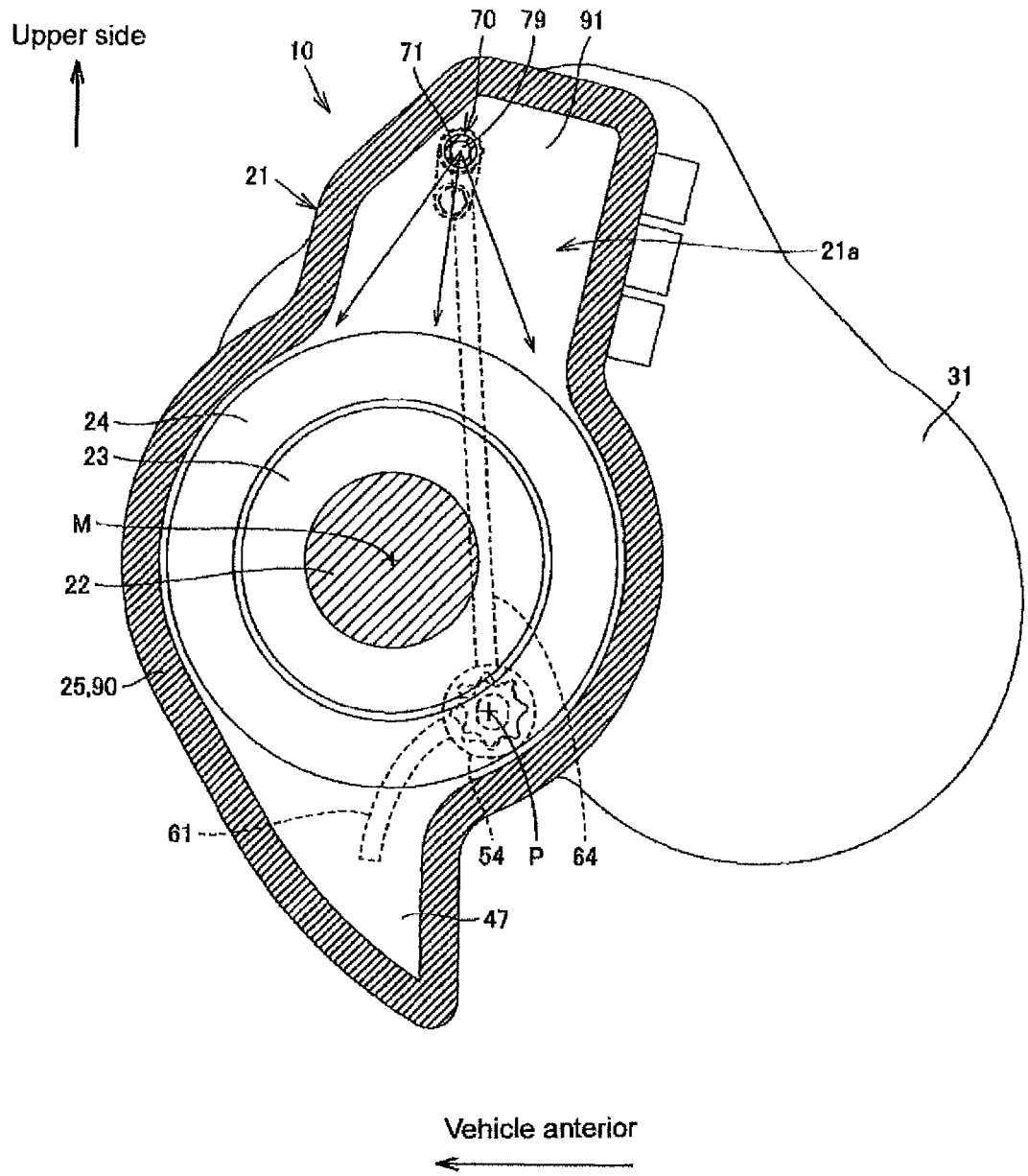
FIG. 3 is a cross sectional view schematically showing an inner structure of a motor unit of an in-wheel motor drive device and a lubricating oil supply structure according to the present invention.

Next describes, with reference to FIGS. 1 to 3, the lubricating oil supply structure in the in-wheel motor drive device 10. FIG. 3 is a cross sectional view showing an internal structure of the motor unit 21 of the in-wheel motor drive device 10, and schematically shows a state viewed from an inner side in the vehicle width direction.

With reference to FIG. 1, the in-wheel motor drive device 10 includes, as the lubricating oil supply structure, an oil tank 47 that stores lubricating oil, an oil pump 54 that pumps up the lubricating oil from the oil tank 47, a suction oil channel 61 and a discharge oil channel 64 that extend in a vertical direction, and an oil pipe 70 that extends in an axle direction. The vehicle width direction indicates the same direction as the axial direction described above.

The oil tank 47 is disposed lower parts of the motor unit 21 and the reducer unit 31. Namely, as shown in FIG. 3, the oil tank 47 is disposed across both the reducer unit casing 43 and the motor casing 25. The oil tank 47 may be provided only a lower part of the reducer unit 31, or may be provided only a lower part of the motor unit 21.

As shown in FIG. 1 and FIG. 2, the oil pump 54 is a trochoid pump having an outer rotor 54*j* and an inner rotor 54*k*. The outer rotor 54*j* is housed in a round chamber formed in the reducer unit casing 43. A center hole of the inner rotor 54*k* has a pump shaft 51 inserted therein, and an inner peripheral surface of the inner rotor 54*k* engages with an outer peripheral surface of the pump shaft 51, and both rotate integrally.

In the present embodiment, the pump shaft 51 is set as a different shaft to the drive transmitting passage. Namely, the pump shaft 51 is provided independently from the plurality of shafts constituting the drive transmitting passage of the reducer unit 31 (input shaft 32, intermediate shaft 35, intermediate shaft 38, and output shaft 41).

More specifically, the axis P of the pump shaft 51 extends parallel to the axis O of the output shaft 41. Moreover, the pump shaft 51 is disposed away from the output shaft 41 in the forward-to-rear direction of the vehicle, is rotatably supported at both ends in the axis P direction via the rolling-element bearings 52*a*, 52*b*, and couples coaxially with the pump gear 53 at a center part in the axis P direction. The pump gear 53 is provided at a position different from the drive transmitting passage, and meshes with the output gear 40. This causes the oil pump 54 to be driven by the output gear 40.

The oil pump 54, for example, is disposed more on one side in the axis P direction than the rolling bearing 52*a*, and is provided on one end of the pump shaft 51 in the axis P direction. The oil pump 54 is positioned substantially coaxial with the pump shaft 51. As shown in FIG. 1, the pump shaft 51, the rolling-element bearings 52*a*, 52*b*, the pump gear 53, and the oil pump 54 are housed in the reducer unit casing 43.

As in the present invention, in a case in which the pump gear 53 meshes with the output gear 40, rotational speed of the oil pump 54 can be reduced in speed as compared to a case in which the oil pump 54 is driven by the input gear 33 or any one of the intermediate gears 34, 36, 37, and 39. As a result, it is possible to improve the durability of the oil pump 54.

Moreover, since the pump gear 53 is configured to mesh with the output gear 40, it is possible to reduce the dimension in the axle direction of the casing 90 (more specifically the reducer unit casing 43) of the in-wheel motor drive device 10 as compared to a case of providing an oil pump coaxially with the output gear 40. This is not limited to the configuration in which the pump gear 53 meshes with the output gear 40; the pump gear may mesh with other gears 33, 34, 36, 37, 39, or the configuration may be one providing the pump gear 51 coaxially with the gear shaft.

Moreover, in the present embodiment, the oil pump 54 is a trochoid pump, however it is not limited to this, and for example may be a cycloid pump or an involute gear pump.

As shown in FIG. 2, the suction oil channel 61 extends in a vertical direction, connects with the oil tank 47 at its lower end, and connects with a suction inlet 62 of the oil pump 54 at its upper end. The discharge oil channel 64 extends in a vertical direction, connects with a discharge opening 63 of the oil pump 54 at its lower end, and connects with one end of the oil pipe 70 at its upper end. The discharge oil channel 64 is formed within the wall thickness of the reducer unit casing 43 on an outer side thereof in the vehicle width direction, namely the front part 43*f*.

The oil pipe 70 forms an oil channel communicating with the discharge oil channel 64 and extending in the axle direction. The oil pipe 70 is fixedly attached in an upper portion of the motor unit 21 and the reducer unit 31. Namely, the oil pipe 70 is not one provided integrally with the reducer unit casing 43 and the motor casing 25 (hereinafter, simply called "casing 90"), but is provided separately to the casing 90.

As shown in FIG. 1, the oil pipe 70 is positioned directly below an upper end wall portion of the casing 90, and is fixed penetrating through the partition 91 of the casing 90. Namely, the oil pipe 70 has a first portion 71 located in the motor chamber 21*a* and a second portion 72 located in the reducer chamber 31*a*, having a portion being inserted through the partition 91 serve as a boundary.

As shown in FIGS. 1 to 3, the oil pipe 70 is disposed above and away from the stator 24 serving as a heating element of the motor unit 21, and from the gears 33, 34, 36, 37, 39, 40 serving as rotational elements of the reducer unit 31. Moreover, as shown in FIG. 2, the oil pipe 70 is disposed within a range between the axis M of the input shaft 32 (motor unit 21) and the axis O of the output shaft 41 in the vehicle front-to-rear direction. More specifically, the oil pipe 70 is disposed within a range between the axis Nf of the intermediate shaft 35 and the axis Nl of the intermediate shaft 38 that are positioned above the input shaft 32 and the output shaft 41.

Figure 4:
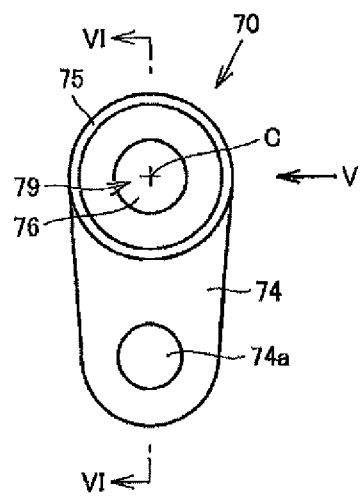
FIG. 4 is a front view of an oil pipe in an embodiment of the present invention, viewed from one end thereof.
Figure 5:
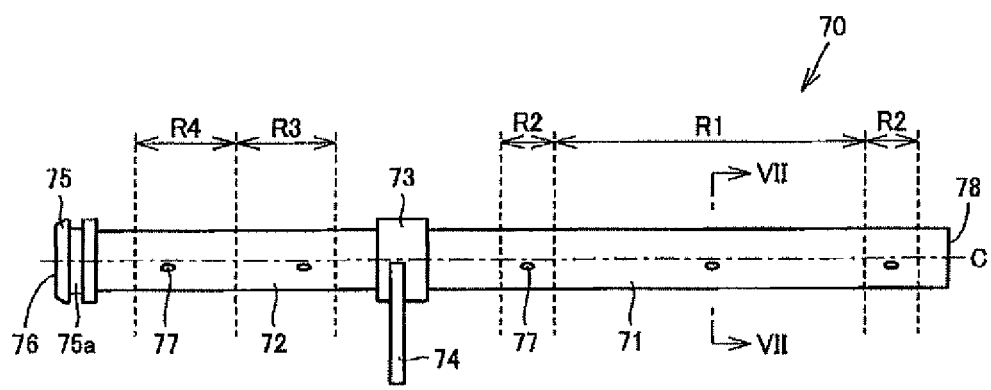
FIG. 5 is a side view of an oil pipe according to an embodiment of the present invention, and is a view viewed from the arrow V direction in FIG. 4.
Figure 7:
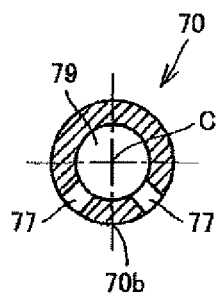
FIG. 7 is a cross sectional view of the oil pipe taken along line VII-VII in FIG. 5.

The configuration of the oil pipe 70 is further described with reference to FIGS. 4 to 7. FIG. 4 is a front view viewing the oil pipe 70 from a one end side. FIG. 5 is a side view of the oil pipe 70, and is a view viewed from a direction shown by arrow V in FIG. 4. FIG. 6 is a sectional view of the oil pipe 70 taken along line VI-VI in FIG. 4. FIG. 7 is a cross sectional view of the oil pipe 70 taken along line VII-VII in FIG. 5.

The oil pipe 70 is a tubular member extending straight from one end to the other end, in which an oil channel 79 is formed. The oil pipe 70 is typically a hollow cylindrical member having a circular cross section. The oil pipe 70 is formed, for example, by shaving out, pipe welding, braze welding, or injection molding rigid material such as metals including aluminum, rolled steel and copper, or resin.

The oil pipe 70 has one inlet 76 from which lubricating oil flows therein, and a plurality of outlets 77 from which the lubricating oil flown in from the inlet 76 is discharged (flown out) downwards. The inlet 76 is provided on one end of the oil pipe 70 (one end in the axle direction), and communicates with the discharge oil channel 64. A lid portion 78 is provided on the other side of the oil pipe 70 (other end in the axle direction), and the plurality of outlets 77 is provided between the one end and the other end of the oil pipe 70.

Diameters (longest inner dimension) D1 of each of the outlets 77 are smaller than an inner diameter of the oil pipe 70, namely a diameter D2 of the inlet 76. Typically, the lid portion 78 has no bore; the lubricating oil is discharged only from the outlets 77. The plurality of outlets 77 are disposed at least spaced apart from each other along the axle direction. Each outlet 77 is positioned below the center line C of the oil pipe 70 in the attached state. This causes the lubricating oil to be discharged downwards through the outlets 77.

In the present embodiment, the one end of the oil pipe 70 is connected to the front part 43f of the reducer unit casing 43, and the other end of the oil pipe 70 (namely lid portion 78) abuts or is proximate to the motor casing cover 25v. Therefore, as shown in FIG. 1, FIG. 5 and FIG. 6, a first portion 71 of the oil pipe 70 includes a region R1 whose position along the axle direction overlaps with the position of the stator core 24a, and two regions R2 that overlap with the positions of the coil ends of the pair of coil ends 24b, respectively. Moreover, a second portion 72 of the oil pipe 72 includes a region R3 whose position along the axle direction overlaps with the gears 33, 34, 39, 40 positioned on the other side in the axle direction, and a region R4 which overlaps with the gears 36, 37 positioned on the one side in the axle direction.

The oil pipe 70 in the present embodiment has a plurality number of outlets 77 in both the first portion 71 and the second portion 72.

In the first portion 71, the outlets 77 are provided at positions overlapping with the position of the stator 24 of the motor unit 21 in the axle direction. More specifically, it is preferable to provide a plurality of the outlets 77 in each of the regions R1, R2, R2, so that the lubricating oil flown in from the inlet 76 is sprayed towards the stator core 24a and the pair of coil ends 24b. Namely, the outlets 77 are preferably provided in each position facing the stator core 24a and the pair of coil ends 24b. More specifically, the outlets 77 are preferably provided in such a manner that virtual straight lines extending from the center C of the oil pipe 70 through the outlets 77 bump into the stator core 24a or the coil ends 24b.

Since the coil ends 24b reach a temperature higher than the stator core 24a, the outlets 77 are to be provided at least at a position facing the coil ends 24b.

Figure 8:
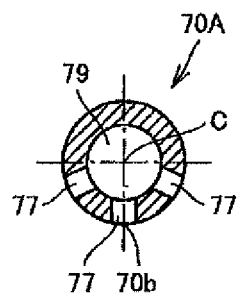
FIG. 8 is a cross sectional view of an oil pipe according to a modification of an embodiment of the present invention.

In the examples shown in FIG. 5 and FIG. 6, two each of the outlets 77 in different circumferential directional positions are provided in the above-mentioned regions R1, R2 and R2. More specifically, for example, as shown in FIG. 7, the outlet 77 is provided at each of two are portions positioned on one side and the other side in the vehicle front-to-rear direction whose lowest position 70b in the attached state among the semicircular part below the center line C of the oil pipe 70 serves as a boundary. As a modification of the oil pipe 70, the outlet 77 may be provided also at the lowest position 70b of the oil pipe 70A, as shown in FIG. 8.

As such, in the first portion 71 of the oil pipe 70 (or oil pipe 70A), since a plurality of the outlets 77 are provided spaced apart from each other in both the axle direction and the circumferential direction, the lubricating oil is sprayed radially from the oil pipe 70 downwards, as schematically shown in FIG. 3. This allows for directly applying the lubricating oil onto a broad range of the stator 24. The outlets 77 may or may not be disposed aligned in the axle and circumferential directions, and may be disposed in for example a staggered arrangement. The same applies for the second portion 72 described later.

In the second portion 72 also, a plurality of the outlets 77 are provided spaced apart from each other along the axle direction and the circumferential direction. In the present embodiment, the outlets 77 in the second portion 72 are provided in both the regions R3 and R4. More specifically, the outlets 77 are each provided in positions facing outer peripheral surfaces of the intermediate gears 36, 37 positioned above the output shaft 41 on the one side in the axle direction, and of the intermediate gears 34, 39 positioned above the output shaft 41 on the other side in the axle direction. More specifically, the outlets 77 are preferably provided in such a manner that virtual straight lines extending from the center line C of the oil pipe 70 through the outlets 77 bump into the intermediate gears 34, 36, 37, and 39.

Depending on the disposed arrangement of the plurality of gears 33, 34, 36, 37, 39, and 40, the outlets 77 may be provided also at positions facing the outer peripheral surfaces of the input gear 33 and the output gear 40 that are positioned relatively lower (on the other side in the axle direction).

Next describes an attachment structure of the oil pipe 70. In the present embodiment, an upper end portion of the discharge oil channel 64 is bent into the inner side in the vehicle width direction (other side in the axle direction), and an opening on the upper end of the discharge oil channel 64 faces the inner side in the vehicle width direction. A large diameter portion 75 formed on the one side of the oil pipe 70 is pressed into and fixed to the opening on the upper end of the discharge oil channel 64. This attaches the one end of the oil pipe 70 to the front part 43f of the reducer unit casing 43. The large diameter portion 75 is formed with a ring-shaped groove 75a for attaching an O-ring 82.

The oil pipe 70 can be maintained in the attached state to the casing 90 to an extent with the pressed and fixed portion on the one end side of the oil pipe and the inserted portion of the partition 91, however in order to prevent disposition in the circumferential direction (rotation) of the oil pipe 70, the oil pipe 70 is preferably fixed to the casing 90 with a bolt 80. Therefore, the oil pipe 70 includes a large diameter portion 73 provided on an end on the other side of the first portion 71 and a flange portion 74 protruding downwards from the large diameter portion 73. The flange portion 74 surface contacts the partition 91. The flange portion 74 has a through hole 74a, and the circumferential position of the oil pipe 70 is fixed by the bolt 80 inserted through the through hole 74a being screwed into the partition 91.

The oil pipe 70 does not need to be a hollow cylindrical shape by the whole, and the oil pipe 70 may just partially include a hollow cylindrical portion. For example, a contour of one part of the oil pipe 70 may be of a polygonal shape. In such a case, the part inserted through the partition 91 and the through hole of the partition 91 is made to be a polygonal shape in the oil pipe 70, and the partition 91 may mate with the oil pipe 70. In this case, since the rotation of the oil pipe 70 is prevented by the mating with the partition 91, the fixture with the bolt 80 will not be essential.

According to the lubricating oil supply structure of the present embodiment, when the oil pump 54 is driven by the output gear 40, the lubricating oil inside the oil tank 47 is drawn in by the oil pump 54. The lubricating oil drawn in is sprayed downwards from the plurality of outlets 77 of the oil pipe 70 fixedly attached to the upper part of the motor unit 21 and the reducer unit 31, towards the heat generating element of the motor unit 21 and the rotating element of the reducer unit 31. This allows to promote the cooling of the heat generating element of the motor unit 21 and the lubrication of the rotating element of the reducer unit 31.

More specifically, in the motor unit 21, the lubricating oil can be directly applied to the upper parts of the stator core 24a and the pair of coil ends 24b; it is therefore possible to effectively draw heat from the stator 24, which stator is the heat generating source. This allows for achieving the reduction in diameter of the motor unit 21. Moreover, the lubricating oil applied to the upper part of the stator 24 flows down, and supplies the lubricating oil to the rolling-element bearings 27, 28 positioned on both ends of the motor rotating shaft 22. Therefore, the lubrication of the rolling-element bearings 27, 28 of the motor unit 21 can also be performed appropriately.

In the reducer unit 31, the lubricating oil is applied from above onto the outer peripheral surfaces of at least the intermediate gears 34, 36, 37, and 39; it is therefore also possible to supply the lubricating oil to the input gear 33 and the meshed part of the output gear 40 by rotation of the gears. Moreover, by the lubricating oil sprayed towards the outer peripheral surfaces of the intermediate gears 34, 36, 37, and 39 of the reducer unit 31, the lubricating oil is supplied to the rolling-element bearings 45a, 45b, 48a, and 48b positioned on both ends of the plurality of intermediate shafts 35 and 38. Furthermore, the lubricating oil is also supplied to the rolling-element bearings 42a, 42b, 44, and 46 positioned on both ends of the input shaft 32 and the output shaft 41, along a groove (not shown) provided within the reducer unit casing 43 for example.

As such, by discharging the lubricating oil downwards from the upper parts of the reducer unit 31, enough lubrication can be accomplished for the intermediate gears 34, 36, 37, and 39 that are difficult for the oil to reach just by splashing. Therefore, since a maximum lubrication performance can be achieved with a small amount of oil, it is possible to contribute to the reduction in weight of the in-wheel motor drive device 10.

Moreover, according to the present embodiment, it is possible to supply the lubricating oil accurately to parts required for lubricating or cooling without undergoing any special processing to the casing 90, namely, with a simple structure. Moreover, since the oil pipe 70 is separate from the casing 90, there is a high degree of freedom in design and fabrication. Therefore, it is possible to provide the outlets 77 in optimum positions according to the internal structure of the motor unit 21 or the reducer unit 31. Namely, in accordance with the internal structure of the motor unit 21 or reducer unit 31, it is possible to select a position in the axle direction and a position in the circumferential direction for the outlets 77, namely the spraying direction of the lubricating oil. Moreover, the size of the outlets 77 (aperture) may also be selected. Furthermore, it is possible to supply the lubricating oil to the positions requiring lubrication, without being constrained to any fabricational technical conditions such as the bending of channels or draft.

The shape of the oil pipe 70 is not limited to the shape extending straight from one end to the other end, and one part thereof may be bent to avoid a component of the motor unit 21 or the reducer unit 31 for example.

Figure 9:
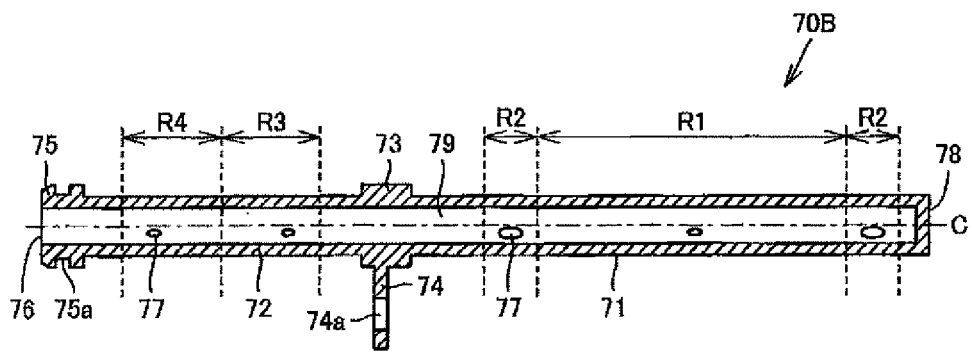
FIG. 9 is a longitudinal section view of an oil pipe according to another modification of an embodiment of the present invention.

Moreover, in accordance with the position or orientation of the outlets 77, the sizes of the outlets may vary. This allows for individually adjusting the sprayed amount of lubricating oil from the outlets 77. More specifically, as shown in the oil pipe 70B in FIG. 9, for example, the size of the outlet 77 facing the pair of coil ends 24b of the motor unit 21 may be larger than the other outlets 77.

In the present embodiment, the oil pump 54 is to be disposed below the shaft center of the output shaft 41 (axis O), however it is not limited to this, and for example may be disposed above the shafts constituting the reducer unit 31. In such a case, the oil pipe 70 may be directly connected to the discharge opening 63 of the oil pump 54 without having the discharge oil channel 64 be formed within the wall thickness of the reducer unit casing 43.

Moreover, in the present embodiment, a plurality of the outlets 77 were to be provided in both of the first portion 71 and the second portion 72 of the oil pipe 70, however just one outlet may be provided in each of the first portion 71 and the second portion 72.

Alternatively, just at least one outlet 77 needs to be provided between the one end of the oil pipe 70 (inlet 76) and the other end thereof. For example, in the case of accomplishing the lubrication of the rotating element of the reducer unit 31 by splashing, the outlet 77 may be provided just in the first portion 71 located in the motor chamber 21a. In this case, the oil pipe may be fixedly attached to just the upper part of the motor unit 21 without penetrating through the partition 91.

Moreover, if the cooling of the heat generating element of the motor unit 21 is accomplished by water cooling, the outlet 77 may be provided just in the second portion 72 located in the reducer chamber 31a. In this case, the oil pipe may be fixedly attached to just the upper part of the reducer unit 31 without penetrating through the partition 91.

In the present embodiment, the reducer unit 31 is a quadruple-shaft type reducer having two intermediate shafts 35 and 38, however it is not limited to this, and for example may be a triple-shaft type reducer. Alternatively, the reducer unit 31 can be any reducer mechanism as long as it is a reducer mechanism with gears, and for example may be a reducer combining a parallel-shaft type gear and a planetary gear.

The embodiments disclosed in the present specification is only exemplary in all aspects, and should be considered not limitative. The scope of the present invention is shown not by the above descriptions but by the claims, and is intended to include meanings equivalent to the scope of the claims and all modifications within the scope.

REFERENCE SIGNS LIST

10 In-wheel motor drive device
11 Wheel hub bearing unit
12 Outer ring
12f, 74 Flange portion 13 Inner fixing member
14 Rolling element
15 Stationary shaft
18 Carrier
21 Motor unit
21a Motor chamber
22 Motor rotating shaft
23 Rotor
24 Stator
24a Stator core
24b Coil end
25 Motor casing
25v Motor casing cover
27, 28, 42a, 42b, 44, 46, 45a, 45b, 48a, 48b, 52a, 52b Bearing
31 Reducer unit
31a Reducer chamber
32 Input shaft
33, 34, 36, 37, 39, 40 Gear
35, 38 Intermediate shaft
41 Output shaft
43 Reducer unit casing
47 Oil tank
51 Pump shaft
53 Pump gear
54 Oil pump
54j Outer rotor
54k Inner rotor
61 Suction oil channel
62 Suction opening
63 Discharge opening
64 Discharge oil channel
70, 70A, 70B Oil pipe
71 First portion
72 Second portion
73, 75 Large diameter portion
76 Inlet
77 Outlet
78 Lid portion
79 Oil channel
80 Bolt
90 Casing
91 Partition
BD Brake disk
M, Nf, Nl, O, P Axis
W Wheel

The invention claimed is:

1. A lubricating oil supply structure in an in-wheel motor drive device, the in-wheel motor drive device comprising: a motor unit configured to drive a wheel; a wheel hub bearing unit; and a reducer unit having a plurality of gears, the reducer unit configured to reduce rotation of the motor unit and transmit that rotation to the wheel hub bearing unit, the lubricating oil supply structure comprising:
an oil tank provided at a lower part of the motor unit and/or the reducer unit, being configured to store lubricating oil;
an oil pump configured to pump up lubricating oil from the oil tank; and
an oil pipe fixedly attached to an upper part of the motor unit and the reducer unit,
wherein the oil pipe includes an inlet, lubricating oil pumped up from the oil pump flowing through the inlet, and at least one outlet provided between one end thereof and the other end thereof, the outlet configured to discharge the lubricating oil flown into the oil pipe from the inlet downwards,
wherein an internal space in the motor unit and an internal space in the reducer unit are partitioned by a partition,
the oil pipe is inserted through the partition and extends in the axle direction, and includes a first portion located in the internal space in the motor unit and a second portion located in the internal space in the reducer unit, and
the outlet is provided in each of the first portion and the second portion.

2. The lubricating oil supply structure according to claim 1, wherein
the oil pipe extends along an axle direction, and
the inlet is provided on one end of the oil pipe located on a side closer to the oil pump, and a plural number of the outlet is provided between the inlet and the other end of the oil pipe along the axle direction, spaced apart from each other.

3. The lubricating oil supply structure according to claim 1, wherein
the motor unit includes a stator core and a pair of coil ends disposed on either side of the stator core, and
in the first portion, the outlet is provided at a position facing the coil ends.

4. The lubricating oil supply structure according to claim 1, wherein
the oil pipe has a flange portion that is fixed to the partition with a bolt.

5. The lubricating oil supply structure according to claim 1, wherein
the motor unit includes a motor casing that configures a contour of the motor unit, and
the reducer unit includes a reducer unit casing that configures a contour of the reducer unit and connects with the motor casing at the partition,
the lubricating oil supply structure further comprising:
a discharge oil channel formed within a wall thickness of the reducer unit casing and extending in a vertical direction, whose lower end communicates with a discharge opening of the oil pump and whose upper end communicates with the inlet of the oil pipe.

6. The lubricating oil supply structure according to claim 1, wherein
the oil pipe includes a hollow cylindrical portion having a circular cross section, and
in the hollow cylindrical portion, a plurality of the outlet is provided in parts varying in circumferential directional positions.

* * * * *